(12) United States Patent
Ette

(10) Patent No.: US 10,053,903 B2
(45) Date of Patent: Aug. 21, 2018

(54) METHOD AND DEVICE FOR ACTUATING A CLOSING ELEMENT FOR A VEHICLE

(71) Applicant: VOLKSWAGEN AKTIENGESELLSCHAFT, Wolfsburg (DE)

(72) Inventor: Bernd Ette, Wolfsburg (DE)

(73) Assignee: Volkswagen AG (DE)

( * ) Notice: Subject to any disclaimer, the term of this patent is extended or adjusted under 35 U.S.C. 154(b) by 43 days.

(21) Appl. No.: 15/121,400

(22) PCT Filed: Feb. 9, 2015

(86) PCT No.: PCT/EP2015/052598
§ 371 (c)(1),
(2) Date: Aug. 25, 2016

(87) PCT Pub. No.: WO2015/139882
PCT Pub. Date: Sep. 24, 2015

(65) Prior Publication Data
US 2016/0362927 A1    Dec. 15, 2016

(30) Foreign Application Priority Data

Mar. 17, 2014    (DE) .................. 10 2014 204 911

(51) Int. Cl.
*H04N 7/18*    (2006.01)
*E05F 15/00*    (2015.01)
(Continued)

(52) U.S. Cl.
CPC .......... *E05F 15/73* (2015.01); *B60R 25/2054* (2013.01); *E05F 2015/765* (2015.01);
(Continued)

(58) Field of Classification Search
CPC .......... H04N 7/18; E05B 65/12; G06F 17/00; G07C 9/00; G06K 9/00; B60R 25/20;
(Continued)

(56) References Cited

U.S. PATENT DOCUMENTS 8,091,280 B2 *   1/2012   Hanzel ................ B60R 25/2054
                                              296/146.4
8,717,429 B2 *   5/2014   Giraud .................... E05B 81/78
                                              348/77
(Continued)

FOREIGN PATENT DOCUMENTS

DE    102006044112 A1    3/2008
DE    102008025669 A1    12/2008
(Continued)

OTHER PUBLICATIONS

Search Report for German Patent Application No. 10 2014 204 911.3; dated Nov. 17, 2014.
(Continued)

*Primary Examiner* — Nam V Nguyen
(74) *Attorney, Agent, or Firm* — Barnes & Thornburg LLP

(57) ABSTRACT

A method for actuating a closing element of a vehicle including optically detecting a directed movement of an object to any point in an area, generating an optical mark for localizing the point if the directed movement has initially been detected; detecting a sequence of movements of the object, wherein the sequence of movements includes the directed movement, and actuating the closing element if the detected sequence of movements meets at least one predetermined requirement.

15 Claims, 6 Drawing Sheets

(51) Int. Cl.
    *G06F 17/00*     (2006.01)
    *G07C 9/00*     (2006.01)
    *G06K 9/00*     (2006.01)
    *B60R 25/20*     (2013.01)
    *B60R 22/00*     (2006.01)
    *E05F 15/73*     (2015.01)

(52) U.S. Cl.
    CPC ....... *E05Y 2400/44* (2013.01); *E05Y 2400/45* (2013.01); *E05Y 2900/532* (2013.01)

(58) Field of Classification Search
    CPC ......... B60R 25/25; B60R 22/00; H01L 31/00; E05F 15/00; E05F 15/20
    USPC ..... 340/5.61, 5.2, 5.8, 5.72; 341/175; 49/25, 49/506; 701/2, 36, 207
    See application file for complete search history.

(56) References Cited

U.S. PATENT DOCUMENTS

| | | | | |
|---|---|---|---|---|
| 8,868,299 | B2* | 10/2014 | Kroemke | B60R 25/2054 701/49 |
| 8,872,096 | B2* | 10/2014 | Grinberg | F16P 3/142 250/208.2 |
| 8,896,417 | B2* | 11/2014 | Song | G08C 19/00 340/5.1 |
| 9,394,737 | B2* | 7/2016 | Gehin | B60R 25/2054 |
| 9,598,049 | B2* | 3/2017 | Sherony | G07C 9/00087 |
| 9,689,982 | B2* | 6/2017 | Herthan | G01S 13/931 |
| 9,768,212 | B2* | 9/2017 | Grinberg | H01L 27/14607 |

FOREIGN PATENT DOCUMENTS

| | | |
|---|---|---|
| DE | 102009025212 A1 | 4/2010 |
| DE | 102009023594 A1 | 12/2010 |
| DE | 102009044389 A1 | 5/2011 |
| DE | 202010017197 U1 | 8/2011 |
| DE | 102012113146 A1 | 1/2014 |
| EP | 2285629 A1 | 2/2011 |
| EP | 2696019 A1 | 2/2014 |
| JP | 2005133529 A | 5/2005 |
| WO | 2009024602 A1 | 2/2009 |
| WO | 2013037465 A1 | 3/2013 |
| WO | 2013037806 A1 | 3/2013 |

OTHER PUBLICATIONS

Search Report for International Patent Application No. PCT/EP2015/052598; dated Apr. 15, 2015.

* cited by examiner

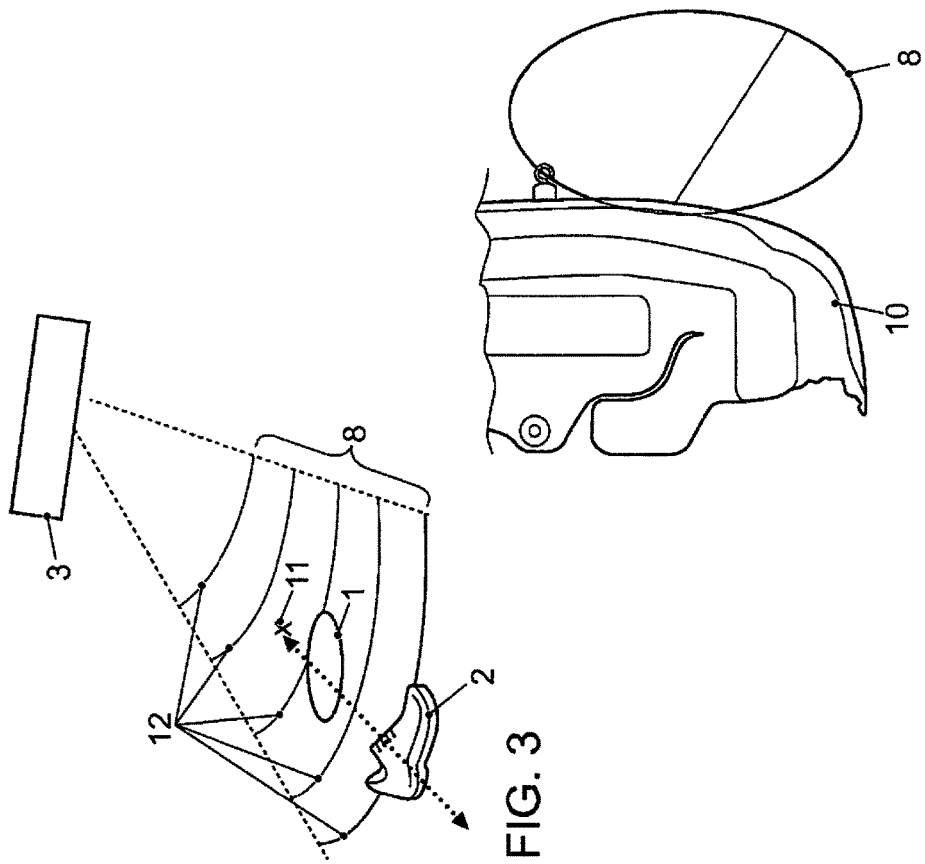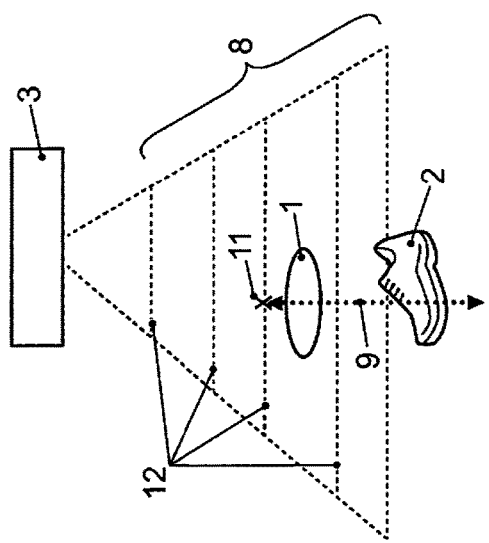

METHOD AND DEVICE FOR ACTUATING A CLOSING ELEMENT FOR A VEHICLE

PRIORITY CLAIM

This patent application is a U.S. National Phase of International Patent Application No. PCT/EP2015/052598, filed 9 Feb. 2015, which claims priority to German Patent Application No. 10 2014 204 911.3, filed 17 Mar. 2014, the disclosures of which are incorporated herein by reference in their entirety.

SUMMARY

Illustrative embodiments provide a method and a device for contactlessly actuating a closing element (in particular, a tailgate) of a vehicle.

BRIEF DESCRIPTION OF THE DRAWINGS

Disclosed embodiments are described in detail below with reference to the figures.

FIG. 2 shows a detection region on an extension of the longitudinal axis of the vehicle behind the vehicle;

FIG. 3 shows a detection region behind the vehicle at a 45° angle to the longitudinal axis of the vehicle;

FIG. 4 shows a top view of a detection region;

DETAILED DESCRIPTION OF THE DISCLOSED EMBODIMENTS

Figure 1:
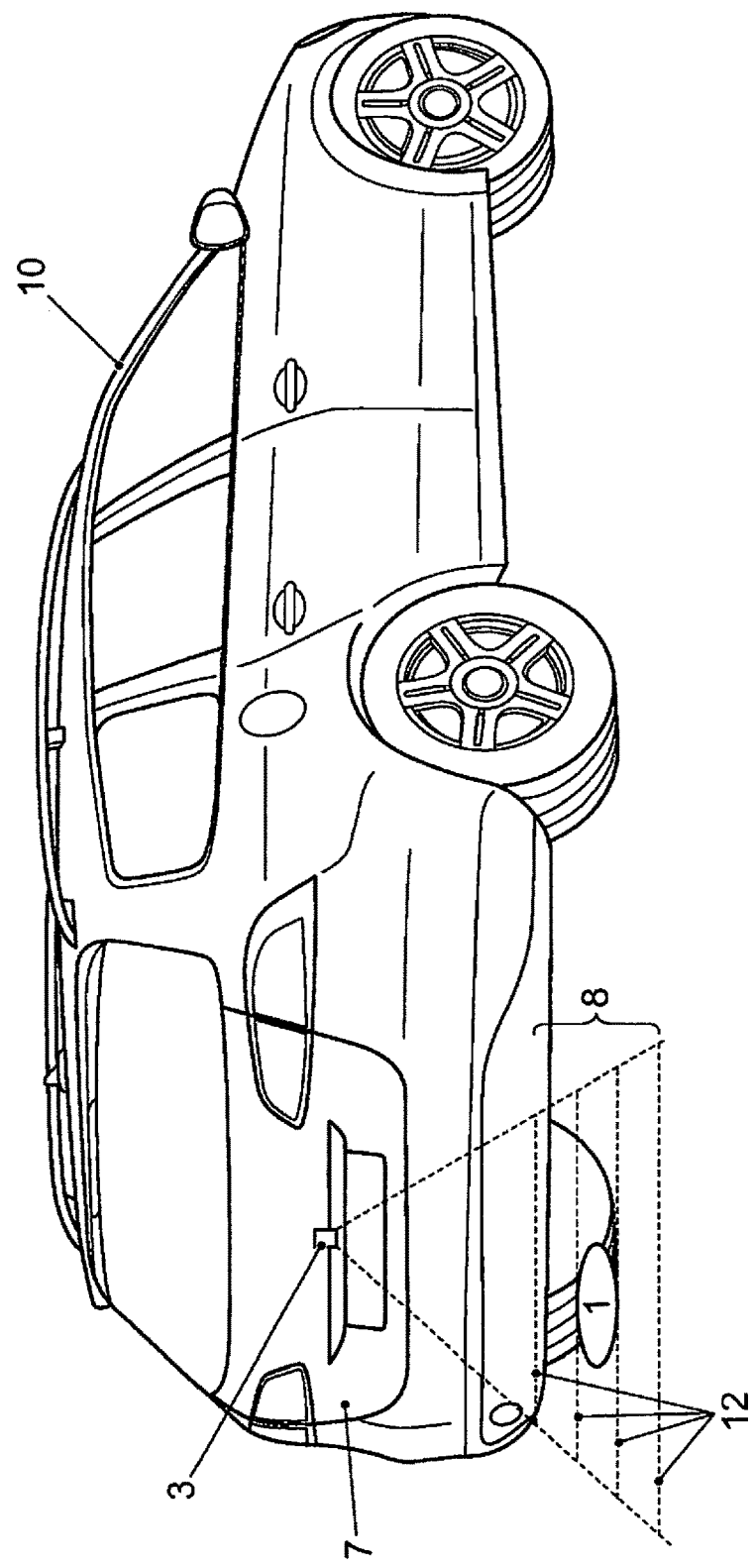
FIG. 1 shows a disclosed embodiment using the actuation of a tailgate of a vehicle.

DE 10 2012 113 146 A1 discloses the actuation of a tailgate of a vehicle. In this case step positions for the actuation of the tailgate are shown on the ground and a step input is detected with an ultrasonic wave sensor unit using a change of the distance. If an entry state is maintained for a predetermined time, the tailgate is opened or closed.

DE 10 2008 025 669 A1 discloses a vehicle closing device actuator. In this case, the presence, the absence and/or the directional movement of an object are detected. For the actuation, a gesture with which a foot is moved in a pattern of directions can be necessary. A logo is projected onto the ground to give information about a successful detection.

WO 2013/037465 A1 describes an optical measurement device for a vehicle. In this case, two light fields are projected onto a surface. The change of the reflections of only one light field triggers a switching process if the reflections of the second light field are not influenced.

According to the state of the art, for example, a tailgate of a vehicle can be opened or closed by a so-called kicking gesture. Because at least certain persons (for example, children or seniors) have difficulties in training the vehicle with such a kicking gesture or subsequently carrying out the kicking gesture correctly, disclosed embodiments provide the contactless actuation of a closing element of a vehicle in a user-friendly manner.

Disclosed embodiments provide a method for the actuation of a closing element of a vehicle and a device for the actuation of a closing element of a vehicle.

Disclosed embodiments provide a method for the actuation of a closing element of a vehicle comprising:

With optical sensor means, a directed displacement of an object to an arbitrary position within a region in the surroundings of the vehicle is detected.

Only if the directed displacement is detected is a visual marking produced on the ground to localize or identify the position.

Detection of a displacement process of the object. In this case, the displacement process comprises the directed displacement.

Only if the detected displacement process satisfies one condition or a plurality of conditions is the closing element actuated.

By the use of the optical sensor means for detecting the directed displacement, the region (in particular, the detection region of the optical sensor means), in which the position is disposed at which the directed displacement is carried out, may adopt significantly larger dimensions than would be the case when detecting the directed displacement by means of a capacitive sensor or by means of an ultrasonic sensor. As a result, the conditions that the detected displacement process must meet can be essentially designed in a more user-friendly manner than is the case according to the state of the art, which enables a more intuitive displacement process for the actuation of the closing element.

According to the disclosed embodiments, the directed displacement of the object is analyzed and the position is determined in the direction of the displacement and is then identified with the visual marking. The visual marking is not only used for localizing the position in this case, but also as an indication that a first part of the displacement process has been correctly detected. The generation of the visual marking is therefore also a type of response to the fact that the disclosed method for the detection of a displacement process or a gesture is ready. In this case the visual marking can be produced with a laser and can have any form (for example, a symbol denoting the respective type of vehicle).

The closing element can be a flap, a door, a window or a sliding roof of the vehicle.

The visual marking is only produced if, following the detection of the directed displacement, an ID transmitter or radio key associated with the vehicle is detected. In this case, the key may be sought in the region of the optical sensor means.

The detection of or searching for the radio key only following the correct detection of the directed displacement and before the generation of the visual marking has the following benefits:

A continuous search for the radio key that is authorized for the vehicle, as is often the case according to the state of the art, whereby energy is saved.

As the visual marking is only produced if the radio key has previously been found, the visual marking may be produced in cases in which an authorized occupant of the vehicle has already carried out at least a part of the displacement process that is necessary for actuation of the closing element. The visual marking cannot be produced by other persons (for example, pedestrians) having no radio key and randomly moving in the correct way to a position in the region.

According to a disclosed embodiment, a check is carried out by means of the optical sensor means as to whether the object reaches the position. If this is the case, a property of the visual marking is changed to signal to the user that the forward movement has been correctly detected.

For example, the visual marking can first flash with a predetermined frequency to then illuminate continuously if the object has reached the position.

The region is at least a predetermined distance (for example, at least 0.4 m) from the vehicle.

In contrast to the state of the art, in which capacitive sensors are mainly used for the detection of the displacement process or kicking gesture, the region in which the displacement process is performed may be at a greater distance from the vehicle. As a result, it is possible to perform the displacement process at a distance from the vehicle that is large enough to be located outside of the pivoting region of a tailgate of the vehicle for example. In other words, the region for the actuation of a certain closing element of the vehicle can be selected such that the operator is not contacted by the closing element owing to the actuation of the closing element, even if the operator does not step back from the vehicle after performing the displacement process.

The object is a human foot or a shoe. In other words, the directed displacement and the displacement process are only correctly detected for an object if the object is a human foot or a shoe. In this case, an object is then detected as a foot or a shoe if a human toe or a toe of a shoe and a transition from the foot to a lower leg are detected as such. In addition, the size and height of the foot are detected. Only if the size and height of the foot lie within a predetermined range is the object considered to be a foot. In this case, the height is understood to be the distance of the foot from the ground, which, for example, should not be greater than 0.3 m. In other words, the closing element can only then be actuated if a foot or a shoe has been detected as the object.

Owing to the limitations on the foot or shoe, the disclosed method is more resistant to erroneous triggering, which can occur, for example, if a case or a bag is placed in the region or if a cat, a dog or a ball passes by the vehicle.

The at least one condition that must be met by the displacement process so that the closing element is actuated comprises one or a plurality of the following conditions:

The displacement process comprises a reverse movement of the object. In this case, the direction of the reverse movement must be opposite to the direction of the directed displacement, which is considered to be a forward movement. In other words, the forward movement of the foot to the position is compared with the reverse movement or the withdrawal of the foot from the position. Only if the two movements correspond to each other, i.e., have directions that are essentially opposite to each other, is the closing element actuated.

The displacement process comprises a dwell period of the object at the position during a predetermined time interval. In other words, the displacement process only meets the at least one condition if the object remains at the position for a predetermined time interval (for example, at least 0.4 s and no more than 3 s). Thus if the object remains at the position for less than a first time period (for example, 0.4 s) or for longer than a second time period (for example, 3 s), the closing element is not actuated.

In this case the directed displacement is directed towards the optical sensor means. In other words, the directed displacement is only then recognized as such if the direction in which the directed displacement is carried out is directed towards the optical sensor means. If on the other hand the direction is not directed towards the optical sensor means, the closing element is not actuated.

Owing to the limitation on the directed displacement, pedestrians or vehicles passing by the vehicle do not perform the directed displacement defined in this way, so that passing pedestrians or passing vehicles, for example, do not even initiate a search for the vehicle key.

Concerning the generation of the visual marking for localizing the position, there is a plurality of versions. In one version the visual marking can be produced exactly at the position. In another version, the visual marking can be produced at a distance from the position (in the extreme case even outside of the region) and can contain directional information, using which the position can be localized starting from the visual marking.

If, following the (first) generation of the visual marking, it is detected that the detected displacement process does not meet the at least one condition, a property of the visual marking is changed to inform a user that the closing element is not actuated.

Once the visual marking is produced for the first time, this signals to the user that a first part of the displacement process has been detected correctly and that, for example, the vehicle key has also been successfully detected. Should the remaining part of the displacement process not correspond to the predetermined conditions, it is beneficial to inform the user thereof as soon as possible, which can be carried out, for example, a rapidly flashing visual marking.

A device for the actuation of a closing element of a vehicle is also provided. In this case, the device comprises a controller, optical sensor means and a light source. The optical sensor means are configured to detect a directed displacement of an object (in particular, of a foot or shoe) at an arbitrary position in a region (for example, the detection region of the sensor means). The light source is configured in combination with the controller to produce a visual marking for localizing the position if the controller has previously detected the directed displacement using the optical sensor means. The optical sensor means are moreover configured to detect a displacement process of the object, wherein the displacement process comprises the directed displacement as the quasi first part. The device is configured to actuate the closing element if the controller has detected that the detected displacement process meets one or a plurality of predetermined conditions.

The benefits of the disclosed device correspond essentially to the benefits of the disclosed method, which have been described in detail above so that repetition thereof is omitted here.

Installation locations for the optical sensor means may be the license plate illumination in a tailgate, a rear outer corner or the B pillar of the vehicle.

According to a disclosed embodiment, the optical sensor means are configured to detect in which of various angular regions of the sensor means the object is detected. In this case the device is configured to detect the directed displacement of the object to the position or the reverse movement of the object away from the position, depending on the angular region in which the object is detected.

For example, the sensor means can be configured to detect whether the object is located within a first or second or third angular region, which essentially forms an angle of 60° or 90° or 120° in a plane parallel to the road at the location of the vehicle at which the optical sensor means are disposed on the vehicle. (An angle of 0° or 180° would run parallel to the side of the vehicle on which the optical sensor is disposed.) In this case, a displacement of the object in the direction of the optical sensor means is only then considered to be a directed displacement, which is considered to be a prerequisite for the actuation of the closing element, if the displacement only crosses or intersects one angular region at the most. In other words, a displacement that intersects two angular regions is not considered to be the directed displacement, which is considered to be the prerequisite for the actuation of the closing element.

According to a further disclosed embodiment, the optical sensor means comprise pixels that are disposed in a matrix. In this case, the optical sensor means are configured to detect in which of various lines within the detection region the object is located. In addition, the optical sensor means detect in which of various rows of the matrix a pixel of the object is detected. In this case, each row of pixels of the matrix corresponds to a line in the detection region, wherein each line essentially runs in the same plane parallel to the road, the lines run parallel to each other and no line touches the vehicle. The device is configured to detect the directed displacement of the object depending on the information regarding in which lines the object is detected.

Because each line quasi-represents a measure of a distance of the object from the vehicle, for example, a displacement of the object in the direction of the optical sensor means is only then considered to be a directed displacement, which is considered to be a prerequisite for the actuation of the closing element, if the object is detected during the displacement of pixels of at least two rows. In this case, the object must first be detected from a pixel of a first row and then from a pixel of a second row, wherein the first row corresponds to a first line and the second row corresponds to a second line and wherein the first line is at a greater distance from the vehicle than the second line.

Disclosed embodiments also comprise a device that is designed to perform the versions described above of the disclosed method.

Finally, the disclosed embodiments also provide a vehicle that besides a closing element also comprises a disclosed device.

The disclosed embodiments are suitable for the actuation of a closing element of a vehicle. Of course, the disclosed embodiments are not limited to the disclosed application area, because the disclosed embodiments can also be used for ships and aircraft as well as rail vehicles or track-guided vehicles. Moreover, it is also conceivable to use the disclosed embodiments for the actuation of a closing element of a stationary object (for example, of a house).

In FIG. 1 a vehicle 10 with a tailgate 7 is illustrated. Near the license plate light of the tailgate 7 there is an optical sensor 3. The optical sensor 3 detects movements in a detection region 8 of the sensor 3.

The optical sensor 3 comprises pixels that are disposed in a matrix in columns and rows. In this case, the rows correspond to lines 12 in the detection region 8 that run parallel to each other along the lateral direction of the vehicle 10. If an object is located on one of the lines 12, the object is detected by the pixels of the row of the matrix of the optical sensor 3 that corresponds to the line 12. As a result, a distance of the object from the optical sensor 3 can be detected.

With the disclosed embodiment, a type of spot 1 can be produced in the center of the detection region 8 as a visual marking for marking or localizing the detection region 8.

The disclosed embodiment illustrated in FIG. 1 is shown again schematically in FIG. 2.

For the actuation of the tailgate 7, for example, the driver moves his foot 2 in the direction of the optical sensor 3 to a position 11 within the detection region 8. During the directed forward movement 9, the foot 2 crosses the three outer lines 12, which is detected using pixels within the rows of the matrix of the optical sensor 3 corresponding to the lines 12. Following a certain stay of the foot 2 at the position 11, the driver must withdraw his foot 2 again in a direction 9, wherein the direction must be the reverse movement essentially antiparallel to the direction of the forward movement and wherein the length of the reverse movement must also essentially correspond to the length of the forward movement to cause the actuation of the tailgate 7. The length of the respective displacement can be detected for this using the lines 12 that are crossed by the foot 2 during the respective displacement.

In FIG. 3 a detection region 8 of the optical sensor 3 is illustrated, which is disposed behind the vehicle 10 at an angle (at an angle of 45° to the longitudinal axis of the vehicle). To carry out an actuation of the tailgate 7 in this case, the foot 2 must first be moved with a forward movement towards the optical sensor 3 to the position 11 in a similar way as with the disclosed embodiment illustrated in FIG. 2, remain there for a predetermined time interval and then be withdrawn in the opposite direction 9 to the initial point.

Using FIG. 3, it is shown that the directed displacement for the actuation of the tailgate 7 can not only run in the direction of the longitudinal axis of the vehicle, but also at an angle to the longitudinal axis of the vehicle, as long as the directed displacement is directed towards the optical sensor 3.

In FIG. 4 the detection region 8 of the optical sensor 3 behind the vehicle 10 is illustrated in a top view.

Figure 5:
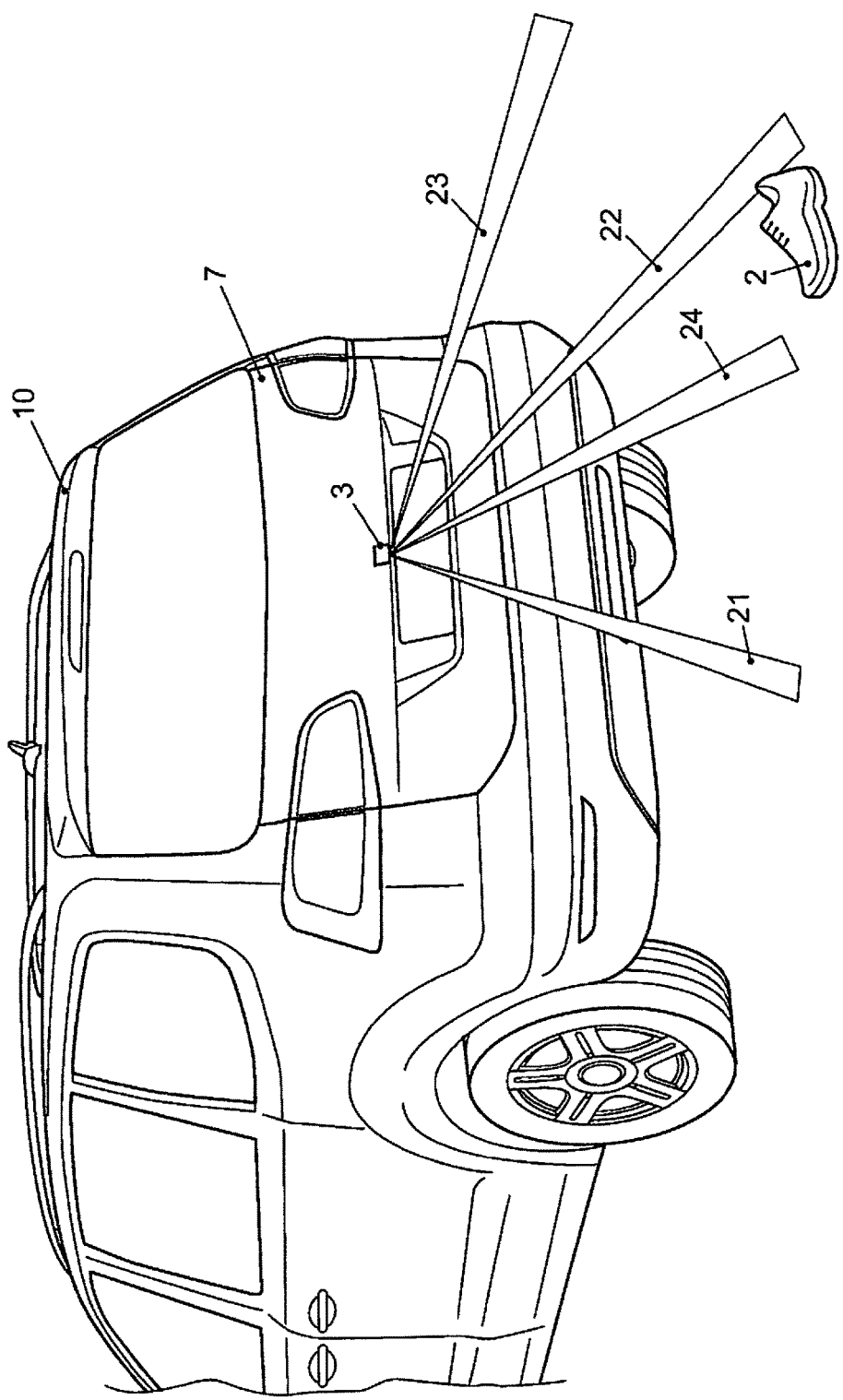
FIG. 5 shows angular regions for the detection of the object for the actuation of a tailgate of the vehicle.

In FIG. 5 a further detail according to the disclosed embodiment for the actuation of a tailgate 7 of a vehicle 10 (comparable with FIG. 1) is illustrated. If the foot 2 is detected by a pixel of a corresponding column of the matrix of the optical sensor 3, then the foot 2 is located within a certain angular region 21-24, wherein the optical sensor 3 is the apex of each angular region 21-24. If the foot (or an object) crosses a plurality of the marked angular regions 21-23 during the displacement, it is a displacement passing the vehicle 10. Using the angular regions 21-23, a distinction can thus be made between a displacement passing the vehicle and a displacement leading towards the optical sensor 3 or a displacement leading away from the optical sensor 3.

In FIG. 5, the angular region in which the foot 2 performs a forward movement and a reverse movement to successfully actuate the tailgate 7 is denoted by the angular region 24.

Figure 6:
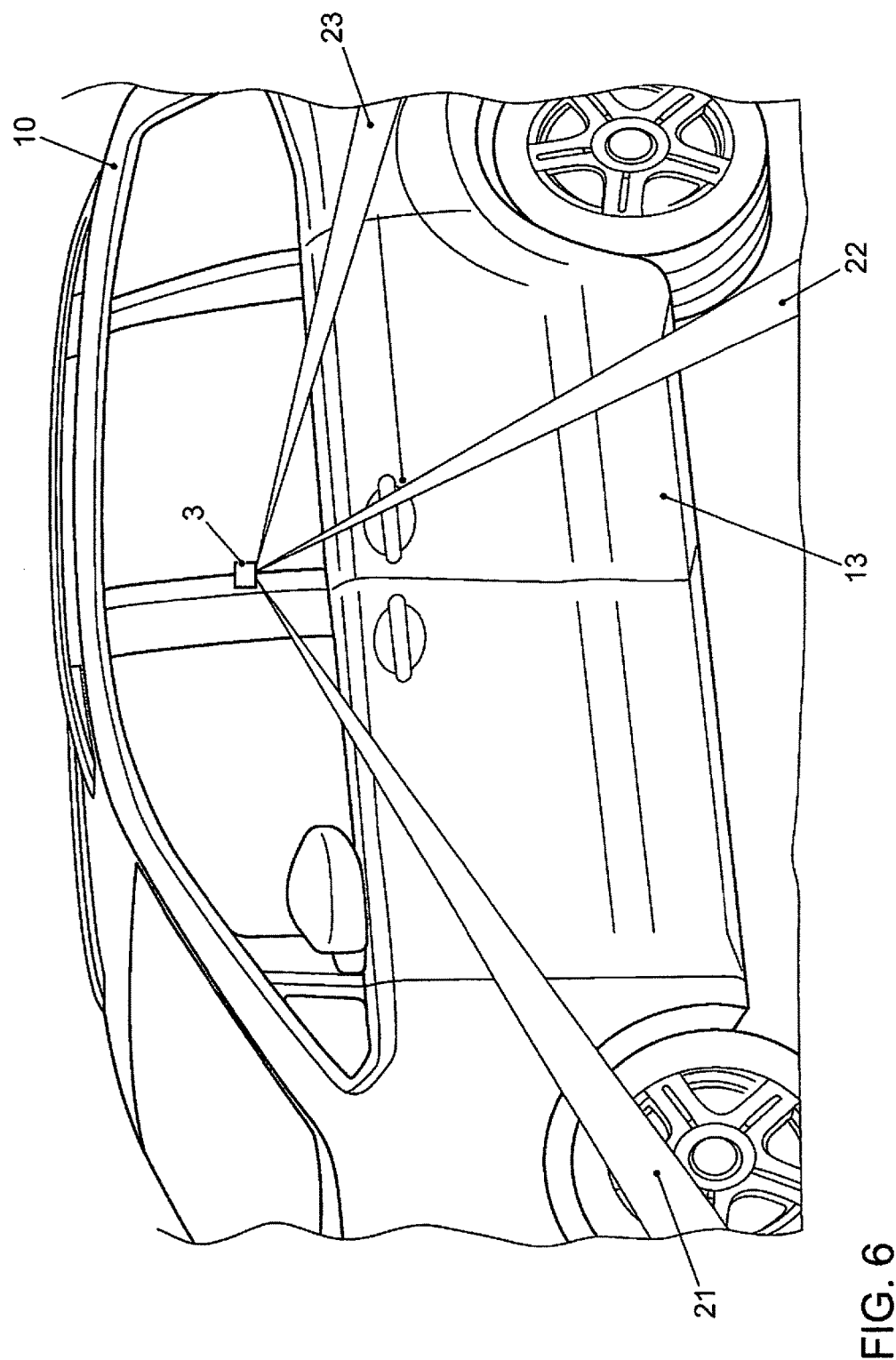
FIG. 6 shows angular regions for the detection of the object for the actuation of a door of the vehicle.

In FIG. 6 a disclosed vehicle with a sliding door 13 is illustrated. In this case the optical sensor 3 is located in the B pillar of the vehicle 10. Once again, using the angular regions 21-23 a distinction can be made between a displacement passing by the vehicle 10 and a displacement that is directed towards the optical sensor 3 or away from the optical sensor 3.

Figure 7:
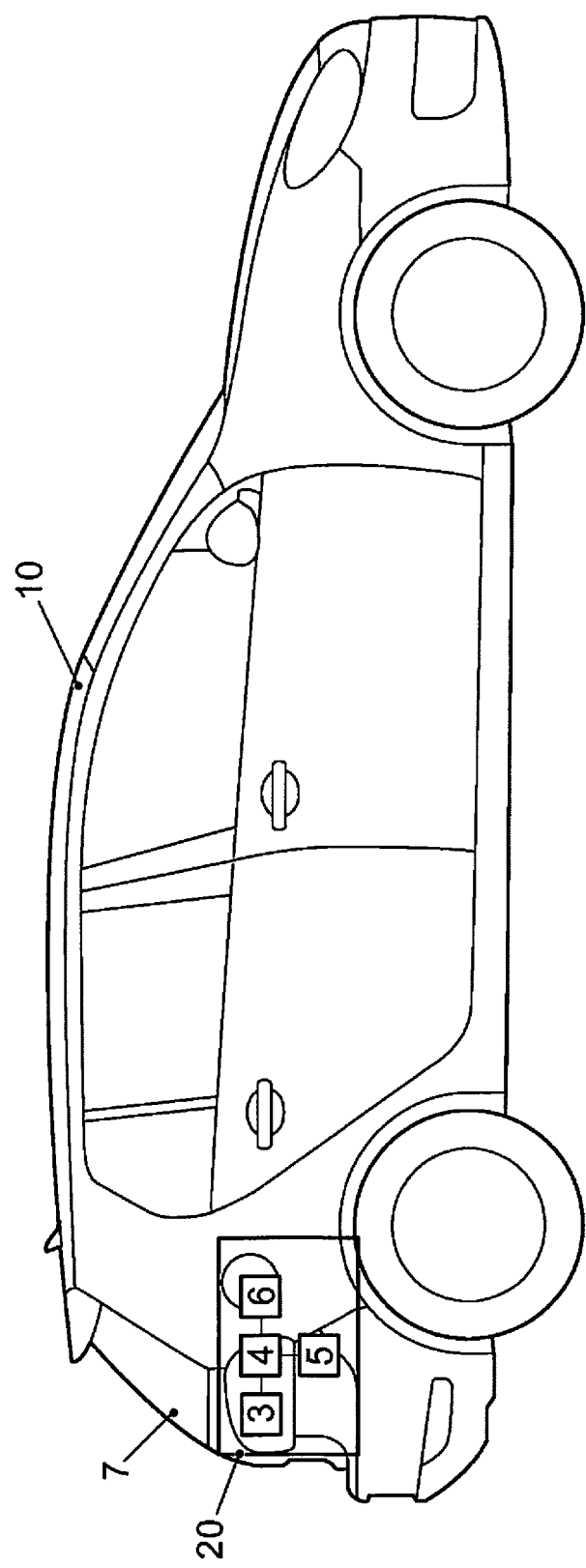
FIG. 7 schematically shows a vehicle with a disclosed device.

In FIG. 7 a vehicle 10 with a device 20 for the actuation of a tailgate 7 of the vehicle 10 is illustrated schematically.

For its part, the device 20 comprises a controller 4, the optical sensor 3, a radio antenna 5 and a laser 6. Whereas a radio key that is authorized for the vehicle 10 can be detected with the radio antenna 5, the laser 6 is configured to produce a visual marking for localizing the position 11 in the detection region 8 of the optical sensor 3.

Figure 8:
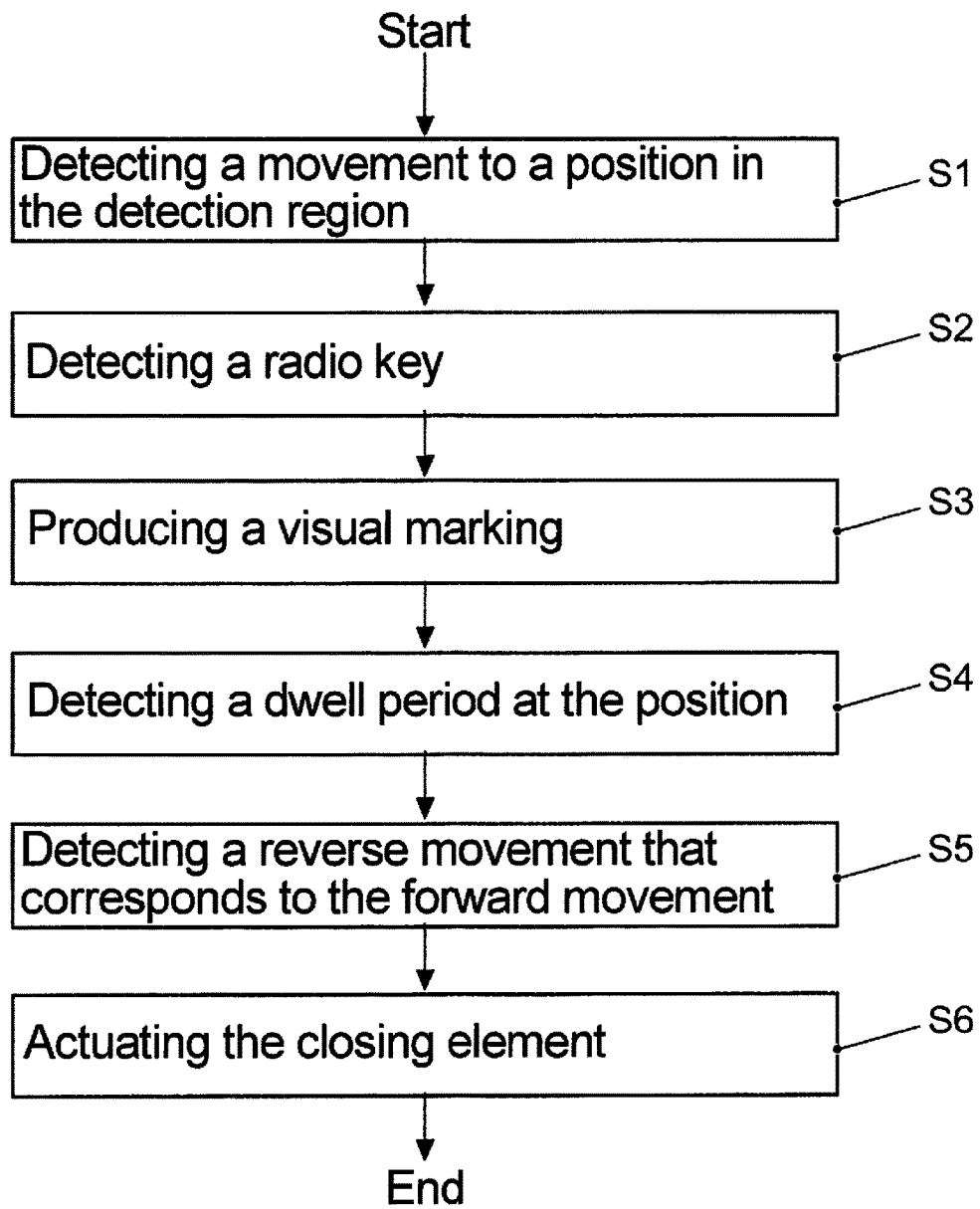
FIG. 8 shows a flow chart of a disclosed method.

In FIG. 8 a flow chart of a disclosed method for the actuation of a closing element 7 of a vehicle 10 is illustrated.

In the first operation at S1 the displacement of an object 2 to a position 11 in the detection region 8 of the optical sensor 3 is detected. Only if the directed displacement directed towards the optical sensor 3 is detected in the first operation at S1 is a radio key that is authorized for the vehicle sought in the region of the optical sensor 3 in the following operation at S2.

Only if the radio key has been detected in operation at S2 is a visual marking of a flashing spot with a frequency of, for example, 1 Hz produced at the position 11 in the following operation at S3. Owing to the generation of the visual marking, a quasi-operating interface is thus projected onto the ground at the position 11. For a correct forward movement, the foot 2 must step on the position 11 or in the spot. In this case, the shape of the foot, the height of the foot as well as the toes of the foot are detected to differentiate the foot (or shoe) from other objects, wherein, in the case of other objects, the disclosed method is terminated, so that no actuation of the closing element is performed. To differentiate a foot or shoe from other objects, the displacement of the toe of the foot can also be detected and the corresponding dynamic image recording that has been acquired with the optical sensor 3 can be analyzed.

Once the foot has been moved to the position 11 in a correct displacement, the visual marking is shown continuously (no longer flashing). In the event of an incorrect displacement of the foot to the position 11 or if no foot is recognized as an object, the imminent termination of the disclosed method is signaled with a rapidly flashing marking (for example, at 3 Hz).

If the displacement of the foot to the position 11 has been correctly detected, the dwelling of the toe at the position 11 is monitored in operation at S4. In this case, the data detected by the optical sensor, which represent the foot, may not change during at least a first time period (for example, 0.4 s) and during at the most a second time period (for example, 3 s), wherein the time period in each case starts at a point in time once the foot 2 reaches the position. The foot must therefore remain at the position 11 during a predetermined time interval. If the foot correctly remains for long enough at the position 11, the visual marking is further produced continuously and in addition a further indication is produced (for example, the so-called third brake light is activated), so that the operator averts his view from the ground.

If the dwell period of the foot 2 at the position 11 has also been correctly detected, a reverse movement of the foot 2 is detected with the optical sensor 3 in the following operation at S5. If the reverse movement corresponds to the forward movement of the foot 2 (if, for example, the directions of motion of the forward and reverse movements are essentially antiparallel), the corresponding closing element of the vehicle is actuated (for example, opened if it is closed or closed if it is open), as described in operation at S6.

REFERENCE CHARACTER LIST 1 visual marking
2 foot or shoe
3 optical sensor
4 controller
5 radio antenna
6 laser
7 tailgate
8 detection region
9 direction of the forward movement or reverse movement
10 vehicle
11 position
12 line
13 sliding door
20 device
21-24 angular region
S1-S6 process operation

The invention claimed is:

1. A method for actuation of a closing element of a vehicle, the method comprising:
   optically detecting a directed displacement of an object to an arbitrary position in a region;
   producing a visual marking for localizing a trigger position in response to the directed displacement having been previously detected;
   detecting a displacement process of the object, wherein the displacement process comprises the directed displacement, including checking whether the object reaches the trigger position and changing a property of the visual marking in response to the object reaching the trigger position; and
   actuating the closing element in response to the detected displacement process meeting meets at least one predetermined condition.

2. The method of claim 1, wherein the generation of the visual marking comprises a search for a key that is authorized for the vehicle, and the visual marking is only produced in response to the key being detected.

3. The method of claim 1, wherein the region is at least at a predetermined distance from the vehicle.

4. The method of claim 1, further comprising:
   detecting whether the object is a human foot using a toe thereof, a transition of the foot into a lower leg, and a size of the human foot,
   wherein the closing element is only actuated in response to detection that the object is the human foot.

5. The method of claim 1, wherein the at least one predetermined condition comprises a condition according to which the displacement process comprises a reverse movement of the object and according to which the direction of the reverse movement is opposite to the direction of the directed displacement.

6. The method of claim 5, wherein the at least one predetermined condition comprises a condition, according to which the object dwells for a predetermined time interval at the position.

7. The method of claim 1, wherein the directed displacement is to be directed towards an optical sensor, wherein the optical sensor is configured for the detection of the directed displacement of the object and of the displacement process of the object.

8. The method of claim 1, wherein
   the visual marking is produced at the position or
   the visual marking is produced at a distance from the position, wherein the visual marking comprises directional information, using which the position is localized starting from the visual marking.

9. The method of claim 1, wherein, in response to, following the generation of the visual marking, detection that the detected displacement process does not meet the at least one predetermined condition, a property of the visual marking is changed to inform a user regarding a failure to meet the at least one predetermined condition.

10. A device for the actuation of a closing element of a vehicle, the device comprising:
    a controller;
    an optical sensor; and
    a light source,
    wherein the optical sensor detect a directed displacement of an object to an arbitrary position in a region, wherein the light source and the controller produce a visual marking for localizing the region if the controller has previously detected the directed displacement by the optical sensor, wherein the optical sensor detects a displacement process of the object, wherein the displacement process comprises the directed displacement, wherein the controller checks whether the object reaches a trigger position and changes a property of the visual marking in response to the object reaching the trigger position, wherein the device actuates the closing element in response to the controller determining that the detected displacement process meets at least one predetermined condition.

11. The device of claim 10, wherein
the optical sensor determines in which of various angular regions of the sensor the object is detected, and
the device detects the directed displacement of the object depending on the angular region in which the object is detected.

12. The device of claim 10, wherein
the optical sensor comprise pixels that are disposed in a matrix,
the optical sensor determine in which of various lines in the region the object is detected by the optical sensor detecting in which of various lines of the matrix a pixel detects the object, wherein each row corresponds to a line, and
the device detects the directed displacement of the object depending on the lines in which the object is detected.

13. The method of claim 10, wherein the directed displacement is to be directed towards the optical sensor, wherein the optical sensor is configured for the detection of the directed displacement of the object and of the displacement process of the object.

14. The device of claim 10, wherein the at least one predetermined condition comprises a condition according to which the displacement process comprises a reverse movement of the object and according to which the direction of the reverse movement is opposite to the direction of the directed displacement.

15. The device of claim 10, wherein, following the generation of the visual marking, in response to the controller detecting that the detected displacement process does not meet the at least one predetermined condition, the property of the visual marking is changed to inform a user regarding a failure to meet the at least one predetermined condition.

* * * * *